(12) United States Patent
Silver

(10) Patent No.: US 12,005,906 B2
(45) Date of Patent: Jun. 11, 2024

(54) USING DRIVER ASSISTANCE TO DETECT AND ADDRESS ABERRANT DRIVER BEHAVIOR

(71) Applicant: WAYMO LLC, Mountain View, CA (US)

(72) Inventor: David Harrison Silver, San Carlos, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/065,722

(22) Filed: Oct. 8, 2020

(65) Prior Publication Data

US 2021/0107494 A1 Apr. 15, 2021

Related U.S. Application Data

(60) Provisional application No. 62/915,134, filed on Oct. 15, 2019.

(51) Int. Cl.
*B60W 40/09* (2012.01)
*B60W 50/06* (2006.01)
(Continued)

(52) U.S. Cl.
CPC ............ *B60W 40/09* (2013.01); *B60W 50/06* (2013.01); *B60W 50/14* (2013.01);
(Continued)

(58) Field of Classification Search
CPC ...... B60W 40/09; B60W 50/06; B60W 50/14; B60W 60/0015; B60W 60/0051;
(Continued)

(56) References Cited

U.S. PATENT DOCUMENTS 8,954,340 B2 2/2015 Sanchez et al.
9,911,050 B2 3/2018 Lynam et al.
(Continued)

FOREIGN PATENT DOCUMENTS

CN 107826118 B 8/2019
EP 2778007 A1 9/2014
(Continued)

OTHER PUBLICATIONS

Amditis, et al, Driver-Vehicle-Environment monitoring for on-board driver support systems: Lessons learned from design and Implementation, Applied Ergonomics 41 (2010) pp. 225-235.
(Continued)

*Primary Examiner* — Peter D Nolan
*Assistant Examiner* — Ashley L Redhead, Jr.
(74) *Attorney, Agent, or Firm* — Botos Churchill IP Law

(57) ABSTRACT

The technology relates to identifying and addressing aberrant driver behavior. Various driving operations may be evaluated over different time scales and driving distances. The system can detect driving errors and suboptimal maneuvering, which are evaluated by an onboard driver assistance system and compared against a model of expected driver behavior. The result of this comparison can be used to alert the driver or take immediate corrective driving action. It may also be used for real-time or offline training or sensor calibration purposes. The behavior model may be driver-specific, or may be a nominal driver model based on aggregated information from many drivers. These approaches can be employed with drivers of passenger vehicles, busses, cargo trucks and other vehicles.

25 Claims, 14 Drawing Sheets

(51) Int. Cl.
*B60W 50/14* (2020.01)
*B60W 60/00* (2020.01)
*G01C 21/30* (2006.01)
*G08G 1/16* (2006.01)

(52) U.S. Cl.
CPC .... *B60W 60/0015* (2020.02); *B60W 60/0051* (2020.02); *G01C 21/30* (2013.01); *G08G 1/166* (2013.01); *B60W 2540/30* (2013.01); *B60W 2556/10* (2020.02); *B60W 2556/65* (2020.02)

(58) Field of Classification Search
CPC ........ B60W 2540/30; B60W 2556/10; B60W 2556/65; B60W 2040/0818; B60W 2050/0029; B60W 2050/0071; B60W 60/0059; G01C 21/30; G01C 21/3641; G01C 21/3658; G08G 1/166
See application file for complete search history.

(56) References Cited

U.S. PATENT DOCUMENTS

| | | | |
|---|---|---|---|
| 9,993,191 | B2 | 6/2018 | Lian |
| 10,007,854 | B2 | 6/2018 | Blayvas et al. |
| 10,209,708 | B2* | 2/2019 | Hoye ................. B60W 30/182 |
| 10,913,464 | B1* | 2/2021 | Qiao ..................... B60W 50/14 |
| 11,048,832 | B2* | 6/2021 | Alvarez .................. G06F 30/15 |
| 2005/0219058 | A1* | 10/2005 | Katagiri ................ B60W 40/09 340/576 |
| 2013/0088369 | A1* | 4/2013 | Yu .......................... G08B 21/06 340/905 |
| 2014/0272810 | A1 | 9/2014 | Fields et al. |
| 2015/0070178 | A1* | 3/2015 | Kline ..................... G08B 21/08 340/576 |
| 2015/0266490 | A1* | 9/2015 | Coelingh ............. G07C 5/0808 701/30.5 |
| 2015/0298654 | A1* | 10/2015 | Joao ........................ G01S 19/13 701/2 |
| 2016/0023666 | A1* | 1/2016 | Lee .......................... A61B 5/18 701/33.4 |
| 2016/0035220 | A1* | 2/2016 | Paromtchik ........... B60W 50/12 701/117 |
| 2016/0110650 | A1* | 4/2016 | Basir ...................... G06N 20/00 706/14 |
| 2016/0203560 | A1 | 7/2016 | Parameshwaran |
| 2018/0061237 | A1* | 3/2018 | Erickson .............. G08G 1/0112 |
| 2018/0154903 | A1 | 6/2018 | Song |
| 2018/0268703 | A1* | 9/2018 | Kang ...................... G08G 1/166 |
| 2018/0374347 | A1* | 12/2018 | Silver ................. G08G 1/0965 |
| 2019/0071072 | A1* | 3/2019 | Seo ....................... G05D 1/0214 |
| 2020/0057487 | A1* | 2/2020 | Sicconi ................... G06T 7/254 |
| 2020/0160627 | A1* | 5/2020 | Jeong ..................... H04L 12/40 |
| 2020/0207359 | A1* | 7/2020 | Tang ...................... B60K 37/06 |
| 2021/0006623 | A1* | 1/2021 | Joao ........................ H04L 67/52 |
| 2021/0024058 | A1* | 1/2021 | Balakrishnan .......... G06Q 50/30 |

FOREIGN PATENT DOCUMENTS

| | | |
|---|---|---|
| JP | 2009018765 A | 1/2009 |
| JP | 2013084236 A | 5/2013 |
| KR | 10-1405679 B | 6/2014 |
| KR | 20150066308 A | 6/2015 |
| KR | 20190111318 A | 10/2019 |
| WO | 2015081335 A2 | 6/2015 |

OTHER PUBLICATIONS

Bergasa, et al, DriveSafe: an App for Alerting Inattentive Drivers and Scoring Driving Behaviors, 6 pages; retrieved from the Internet Mar. 3, 2019.

Brooks, et al, In-vehicle Technologies, Advanced Driver Assistance Systems and Driver Distraction: Research challenges, Queensland University of Technology, 7 pages; retrieved from the Internet Mar. 3, 2019.

Cades, et al., Driver Distraction and Advanced Vehicle Assistive Systems (ADAS): Investigating Effects on Driver Behavior, Springer International Publishing Switzerland, 2017, pp. 1014-1022.

Eckstein, et al, Safety Potential of ADAS—Combined Methods for an Effective Evaluation, RWTH Aachen University, Germany, 7 pages; retrieved from the Internet Mar. 3, 2019.

Jain, et al, Car that Knows Before You Do: Anticipating Maneuvers via Learning Temporal Driving Models, Stanford University, pp. 3182-3190; retrieved from the Internet Mar. 3, 2019.

National Transportation Safety Board Accident Report, HAR-17/02, 2017, 63 pages.

Ziefle, et al, Visual and Auditory Interfaces of Advanced Driver Assistant Systems for Older Drivers, RWTH Aachen University, pp. 62-69; retrieved from the Internet Mar. 3, 2019.

International Search Report and Written Opinion for Application No. PCT/US2020/055373 dated Jan. 29, 2021.

The Extended European Search Report for European Patent Application No. 20876127.0, dated Aug. 3, 2023, 7 Pages.

Notice for Reasons for Rejection for Japanese Patent Application No. 2022-515680, Apr. 4, 2023.

Office Action for Korean Patent Application No. 10-2022-7011297. Feb. 22, 2024, 10 Pages.

\* cited by examiner

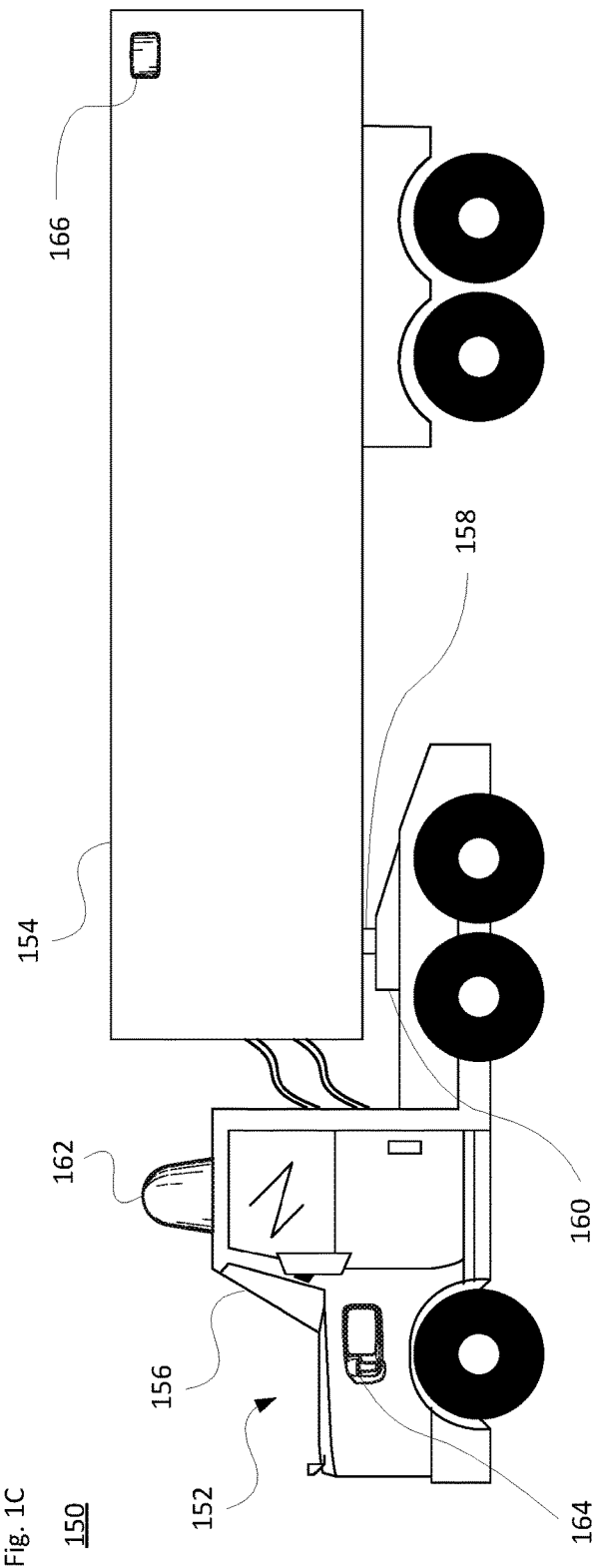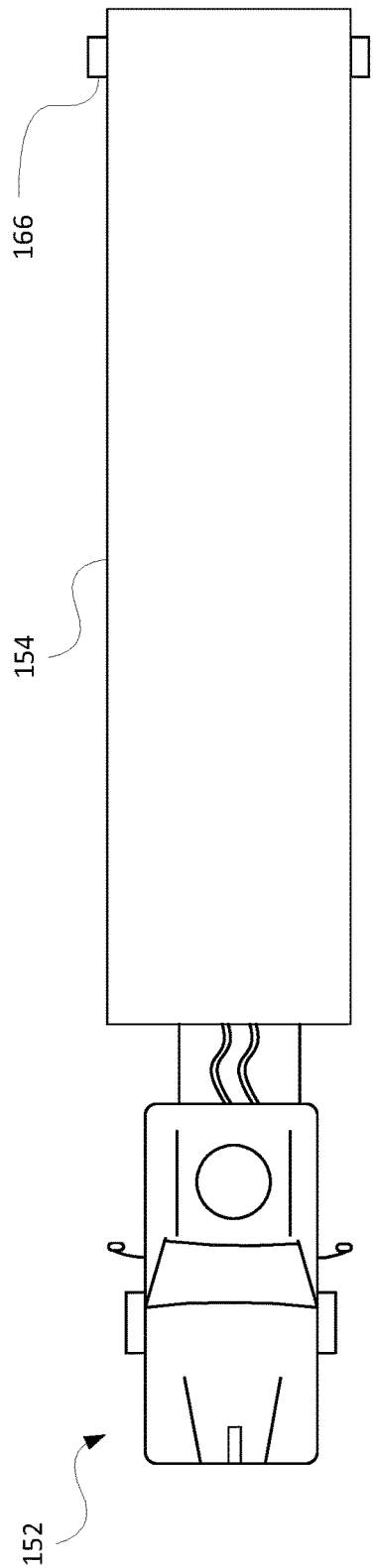

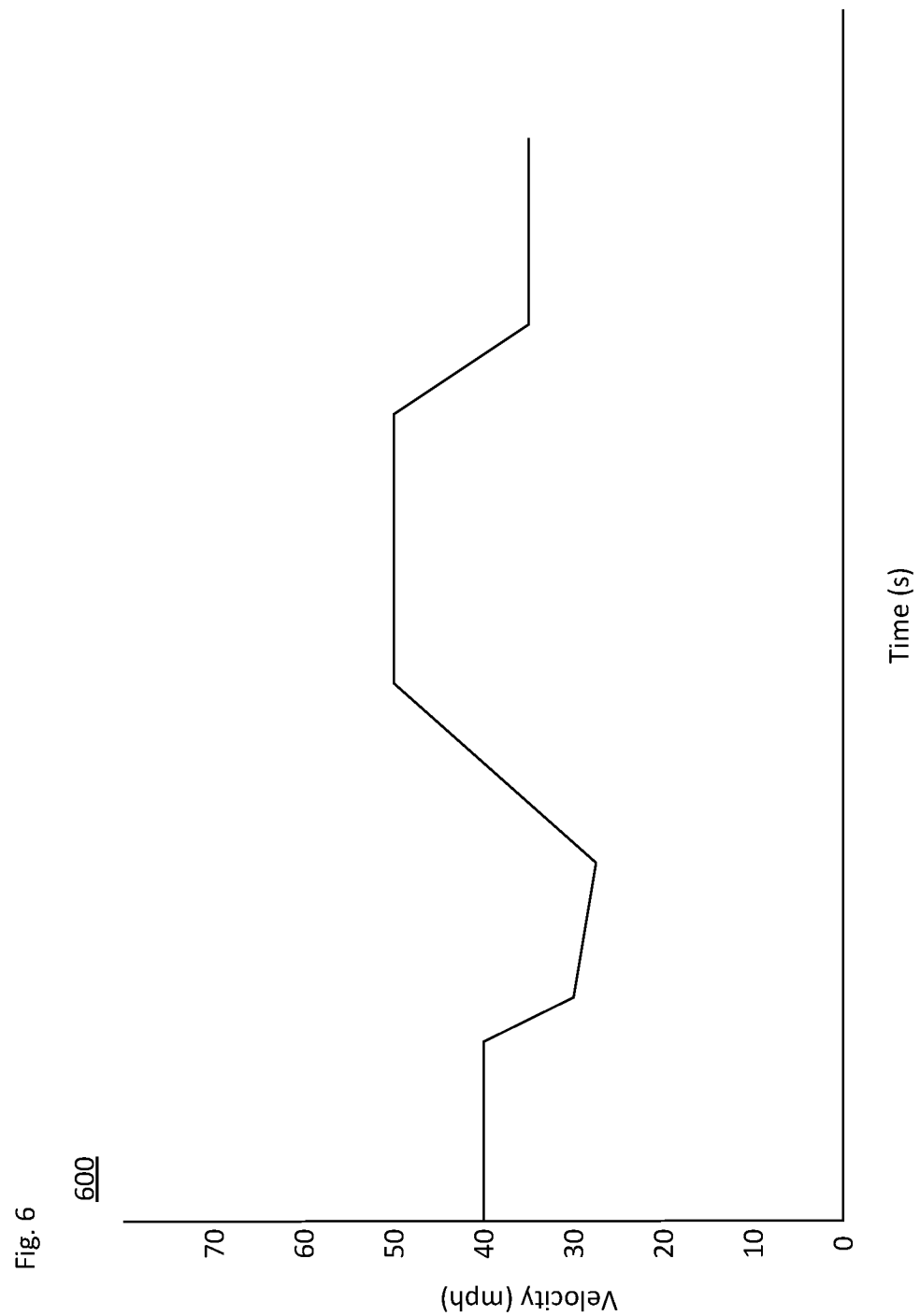

700

USING DRIVER ASSISTANCE TO DETECT AND ADDRESS ABERRANT DRIVER BEHAVIOR

CROSS-REFERENCE TO RELATED APPLICATIONS

This application claims the benefit of the filing date of U.S. Provisional Application No. 62/915,134, filed Oct. 15, 2019, the entire disclosure of which is incorporated by reference herein.

BACKGROUND

Existing onboard advanced driver assistance systems (ADAS) may automate certain driving tasks. For instance, ADAS may provide lane departure warnings and warnings about coming too close to the vehicle in front via a forward collision warning. In other examples, ADAS can also adjust driving via automated lane following, automatic braking and advanced cruise control features. Other systems may also track driver eye movement and whether hands are on the steering wheel, which can be used to evaluate attentiveness. These approaches may operate according to instantaneous vehicle status over a short time scale, e.g., the preceding few seconds. However, such approaches may not be able to provide a robust evaluation of certain repeated behaviors or to use that evaluation in route planning or other driving operations.

BRIEF SUMMARY

The technology relates to identifying and addressing aberrant driver behavior in vehicles that are capable of performing in a partially autonomous driving mode, or otherwise include an advanced driver assistance system. This can include passenger vehicles, busses, cargo vehicles, etc. According to aspects of the technology, driver operations may be evaluated over meaningful time scales, e.g., tens of second, minutes, hours or longer. Different factors are considered in the evaluation, including driver errors and suboptimal maneuvering that may not rise to a threshold level of an "error". Driver errors can include one or more lane departures, delayed braking for an upcoming obstacle, failure to obey a traffic signal or sign, etc. Suboptimal maneuvering can include weaving or otherwise drifting within a lane without departing from it, which would not trigger a lane departure warning. Other suboptimal maneuvers can include abrupt lane changes, failure to signal, hard braking, jerky/stutter braking, etc. Any or all of these may be evaluated by an onboard driver assistance system and compared against a model of expected driver behavior. The information generated as a result of this comparison can be used in a variety of ways. For instance, the onboard system may take immediate corrective driving action and/or alert the driver. It may also be used for offline training or sensor calibration purposes. These and other aspects of the technology are discussed further below.

In accordance with one aspect, a method is provided. The method includes performing, by one or more processors, state tracking of driving actions performed by a driver of a vehicle, and receiving, by the one or more processors, sensor information from a perception system of the vehicle. The method also includes determining that one or more aberrant driving actions have been performed based on the state tracking of the driving actions during one or both of a given timeframe or distance of travel, and comparing the determined aberrant driving actions with a behavior model. The method further includes creating a variance signal based on the comparison. The variance signal indicates a deviation in driver performance relative to the behavior model. The method includes selecting an action from among one or more classes of actions in response to the variance signal, and then performing the selected action.

In one example, the behavior model is an aggregated model based on information from multiple drivers other than the driver of the vehicle. In another example, the behavior model is specific to the driver of the vehicle based on his or her past driving history.

Determining that the one or more aberrant driving actions have been performed may include evaluating at least one of a number of sensors of the perception system, an accuracy of each sensor of the perception system, a sensor field of view, or an arrangement of sensors around the vehicle. Determining that the one or more aberrant driving actions have been performed may additionally or alternatively include evaluating at least one of lane departures, weaving within a lane, a speed profile, a braking profile, or a turning profile. And determining that the one or more aberrant driving actions have been performed may alternatively or additionally include comparing the state tracking of driver actions with at least one of map information and the received sensor information.

The one or more classes of actions may include at least one of warning the driver, autonomous operation of the vehicle, or alerting other vehicles.

The method may further include performing calibration of one or more sensors of the perception system based on the state tracking. And performing the selected action may include at least one of autonomously performing a corrective driving action or providing an alert to the driver regarding the determined aberrant driving actions.

According to another aspect, a control system for a vehicle is provided. The control system comprises memory configured to store a behavior model, and one or more processors operatively coupled to the memory. The one or more processors are configured to perform state tracking of driving actions performed by a driver of the vehicle, receive sensor information from a perception system of the vehicle, and determine that one or more aberrant driving actions have been performed based on the state tracking of the driving actions during one or both of a given timeframe or distance of travel. The processors are also configured to compare the determined aberrant driving actions with the behavior model and create a variance signal based on the comparison. The variance signal indicates a deviation in driver performance relative to the behavior model. The processors are further configured to select an action from among one or more classes of actions in response to the variance signal, and to perform the selected action. Performing the selected action may include at least one of autonomously performing a corrective driving action by instructing a driving system of the vehicle to take the corrective action, or providing an alert to the driver regarding the determined aberrant driving actions via a user interface system of the vehicle.

In one example, the behavior model is an aggregated model based on information from multiple drivers other than the driver of the vehicle. In another example, the behavior model is specific to the driver of the vehicle based on his or her past driving history.

The determination that one or more aberrant driving actions have been performed may include evaluation of at least one of a number of sensors of the perception system, an accuracy of each sensor of the perception system, a sensor field of view, or an arrangement of sensors around the vehicle. Alternatively or additionally, determination that one or more aberrant driving actions have been performed includes evaluation of at least one of lane departures, weaving within a lane, a speed profile, a braking profile, or a turning profile. And the determination that one or more aberrant driving actions have been performed may alternatively or additional include a comparison of the state tracking of driver actions with at least one of map information and the received sensor information.

The one or more classes of actions may include at least one of warning the driver, autonomous operation of the vehicle, or alerting other vehicles.

The control system may be further configured to perform calibration of one or more sensors of the perception system based on the state tracking.

The control system may further comprising the perception system.

And in accordance with another aspect, a vehicle is configured to evaluate aberrant driving actions of a driver while operating in a partially autonomous driving mode. The vehicle including the control system, the perception system, and the driving system described above and further detailed below.

BRIEF DESCRIPTION OF THE DRAWINGS

FIGS. 1C-D illustrate an example cargo-type vehicle configured for use with aspects of the technology.

FIG. 6 illustrates an example speed profile scenario in accordance with aspects of the technology.

DETAILED DESCRIPTION

Figure 1A:
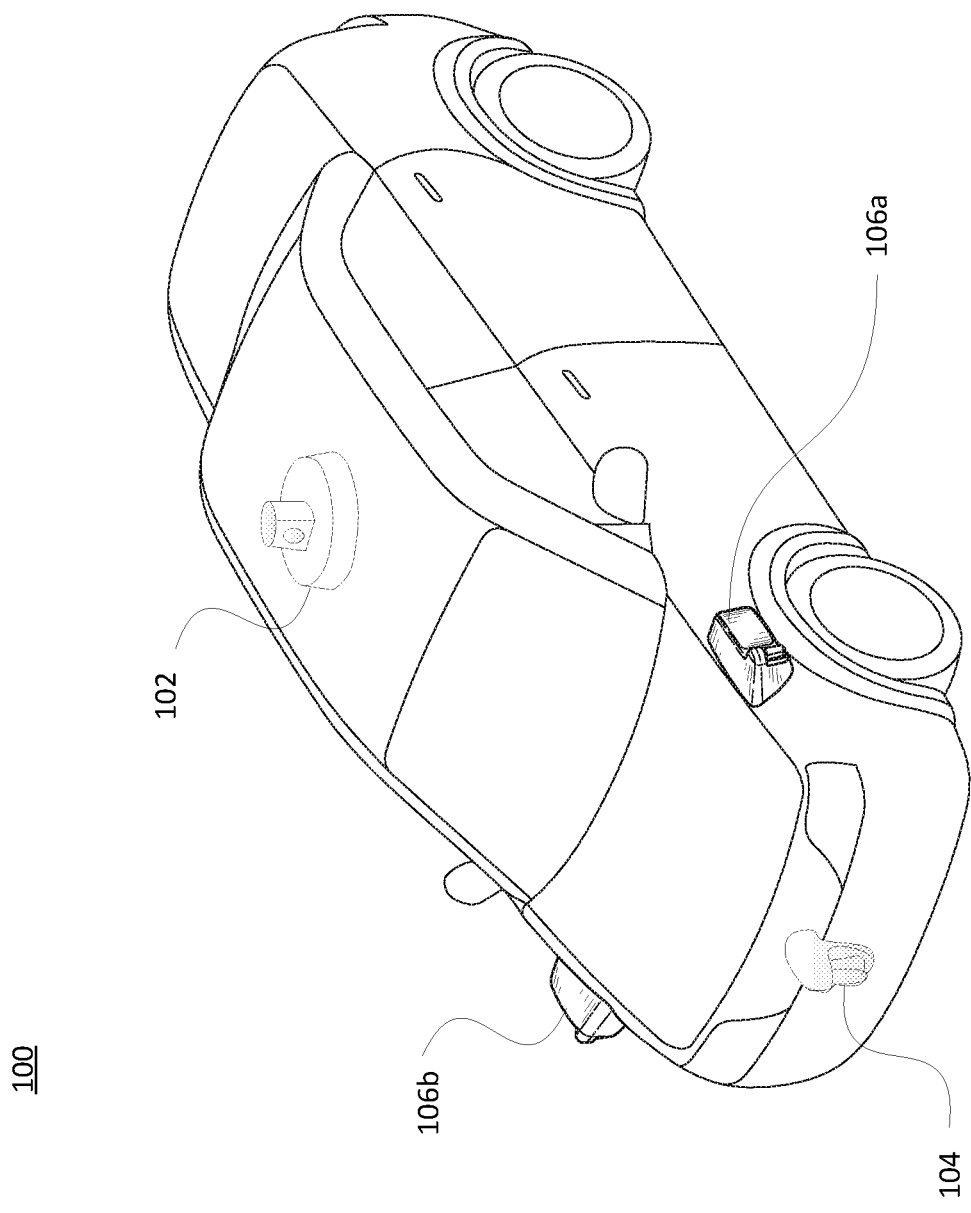
FIGS. 1A-B illustrate an example passenger-type vehicle configured for use with aspects of the technology.
Figure 1B:
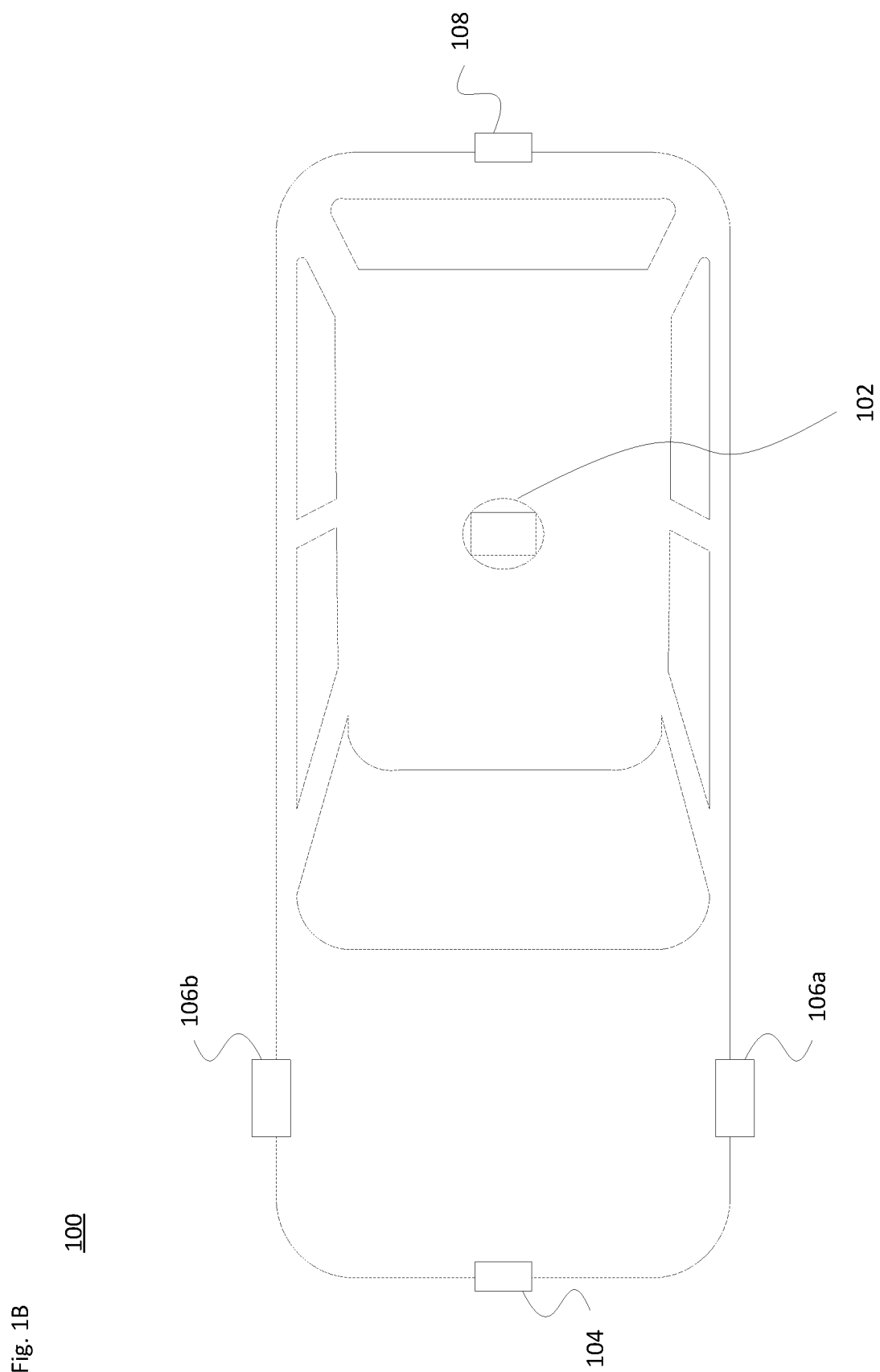

The on-board driver assistance system evaluates information about the driver's operation of the vehicle over time. The evaluation may include comparing particular actions (or inactions) against a stored driver behavior model. The behavior model may be based on past actions and driving habits of the driver, a nominal model based on general driving expectations, or other factors. One or both of driving errors and suboptimal driving may be included in the evaluation. As a result, the system may determine that the operation of the vehicle is aberrant, in which case corrective action or an alert to the driver or others may be performed.
Example Vehicle Systems FIG. 1A illustrates a perspective view of an example passenger vehicle 100, such as a sedan, minivan, sport utility vehicle (SUV) or other vehicle. FIG. 1B illustrates a top-down view of the passenger vehicle 100. The passenger vehicle 100 may include various sensors for obtaining information about the vehicle's external environment, which can be used by an on-board ADAS system or other system capable of operating the vehicle in a semi-autonomous driving mode. For instance, a roof-top unit 102 may include a Lidar sensor as well as various cameras, radar units, infrared and/or acoustical sensors. Sensor unit 104, located at the front end of vehicle 100, and units 106a, 106b on the driver's and passenger's sides of the vehicle may each incorporate lidar, radar, camera and/or other sensors. For example, unit 106a may be located in front of the driver's side door along a quarter panel of the vehicle. And as shown in FIG. 1B, a sensor unit 108 may be positioned along the rear of the vehicle 100, such as on or adjacent to the bumper. In some examples, the passenger vehicle 100 also may include various sensors for obtaining information about the vehicle's interior spaces (not shown).

FIGS. 1C-D illustrate an example cargo vehicle 150, such as a tractor-trailer truck. The truck may include, e.g., a single, double or triple trailer, or may be another medium or heavy duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154.

As with the sensor units of the passenger vehicle of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle including, but not limited to, cars, trucks, motorcycles, buses, recreational vehicles, etc.

As noted above, the present technology is applicable to advanced driver assistance systems (ADAS) and other systems capable of providing at least partial autonomy in a self-driving mode. There are different degrees of autonomy that may occur for a vehicle operating in a partially autonomous driving mode. The U.S. National Highway Traffic Safety Administration and the Society of Automotive Engineers have identified different levels to indicate how much, or how little, the vehicle is able to control driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. The architectures, components, systems and methods described herein can function in any these modes. These systems are generally referred to herein as driver assistance systems.

Figure 2:
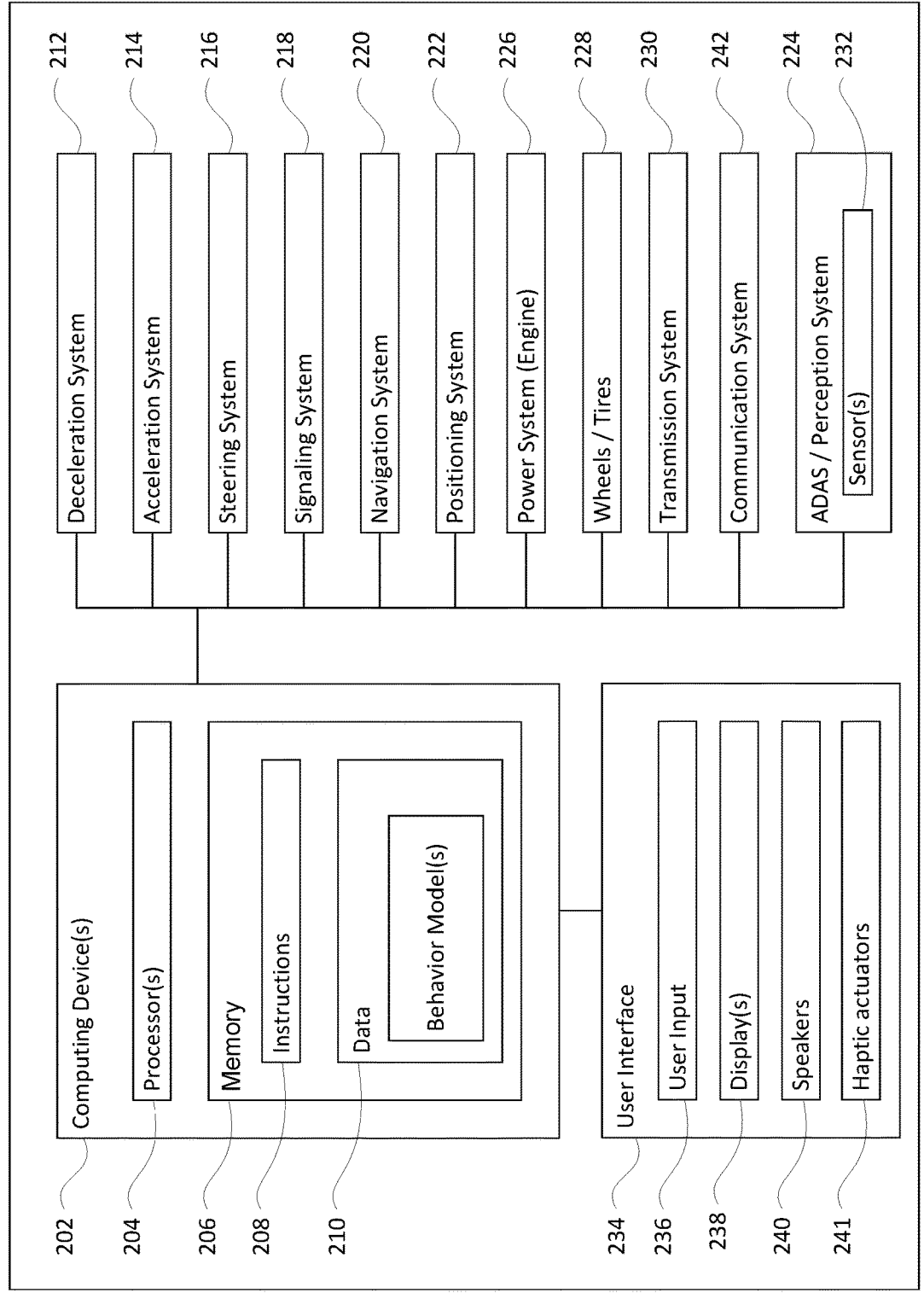
FIG. 2 is a block diagram of systems of an example passenger-type vehicle in accordance with aspects of the technology.

FIG. 2 illustrates a block diagram 200 with various components and systems of an exemplary vehicle, such as passenger vehicle 100, to enable driver assistance. As shown, the block diagram 200 includes a control system having one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control one or more operations of the vehicle when providing driver assistance or otherwise operating in a partially autonomous driving mode.

The memory 206 stores information accessible by the processors 204, including instructions 208 and data 210 that may be executed or otherwise used by the processors 204. By way of example, the data 210 may include one or more behavior models associated with driving behavior. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form a driving computing system incorporated into vehicle 100 so that the vehicle may perform various driver assistance operations. The driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose).

As show in this example, the computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in a partially autonomous driving mode. Some or all of the wheels/tires 228 are coupled to the transmission system 230, and the computing devices 202 may be able to receive information about tire pressure, balance and other factors that may impact driving.

The computing devices 202 may control the direction and speed of the vehicle by controlling various components. By way of example, computing devices 202 may navigate the vehicle to a destination location using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224, which may be part of or work in conjunction with an advanced driver assistance system, includes one or more onboard sensors 232. The sensors may be used to detect objects external to the vehicle. The detected objects may be other vehicles, obstacles in the roadway, traffic signals, signs, trees, etc. The sensors 232 may also detect certain aspects of weather conditions, such as snow, rain or water spray, or puddles, ice or other materials on the roadway.

By way of example only, the perception system 224 may include one or more lidar sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc. The perception system 224 may also include other sensors within the vehicle to detect objects and conditions within the vehicle, such as in the passenger compartment. For instance, such sensors may detect a position of the driver, whether his or her hands are on the steering wheel, eye gaze direction, etc. Still further sensors 232 of the perception system 224 may measure the rate of rotation of the wheels 228, an amount or a type of braking by the deceleration system 312, and other factors associated with the equipment of the vehicle itself.

The raw data from the sensors and the aforementioned characteristics can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects in accordance with an evaluation of driver behavior as discussed further below. In addition, the computing devices 202 may perform calibration of individual sensors, all sensors in a particular sensor assembly, or between sensors in different sensor assemblies or other physical housings.

As illustrated in FIGS. 1A-B, certain sensors of the perception system 224 may be incorporated into one or more sensor units. In one example, these may be integrated into the side-view mirrors on the vehicle. In another example, other sensors may be part of the roof-top housing 102, or other sensor units. The computing devices 202 may communicate with the sensor units located on or otherwise distributed along the vehicle. Each unit may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 and/or haptic actuators 241 to provide tactile feedback to the driver may also be located within the passenger vehicle.

The passenger vehicle also includes a communication system 242. For instance, the communication system 242 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
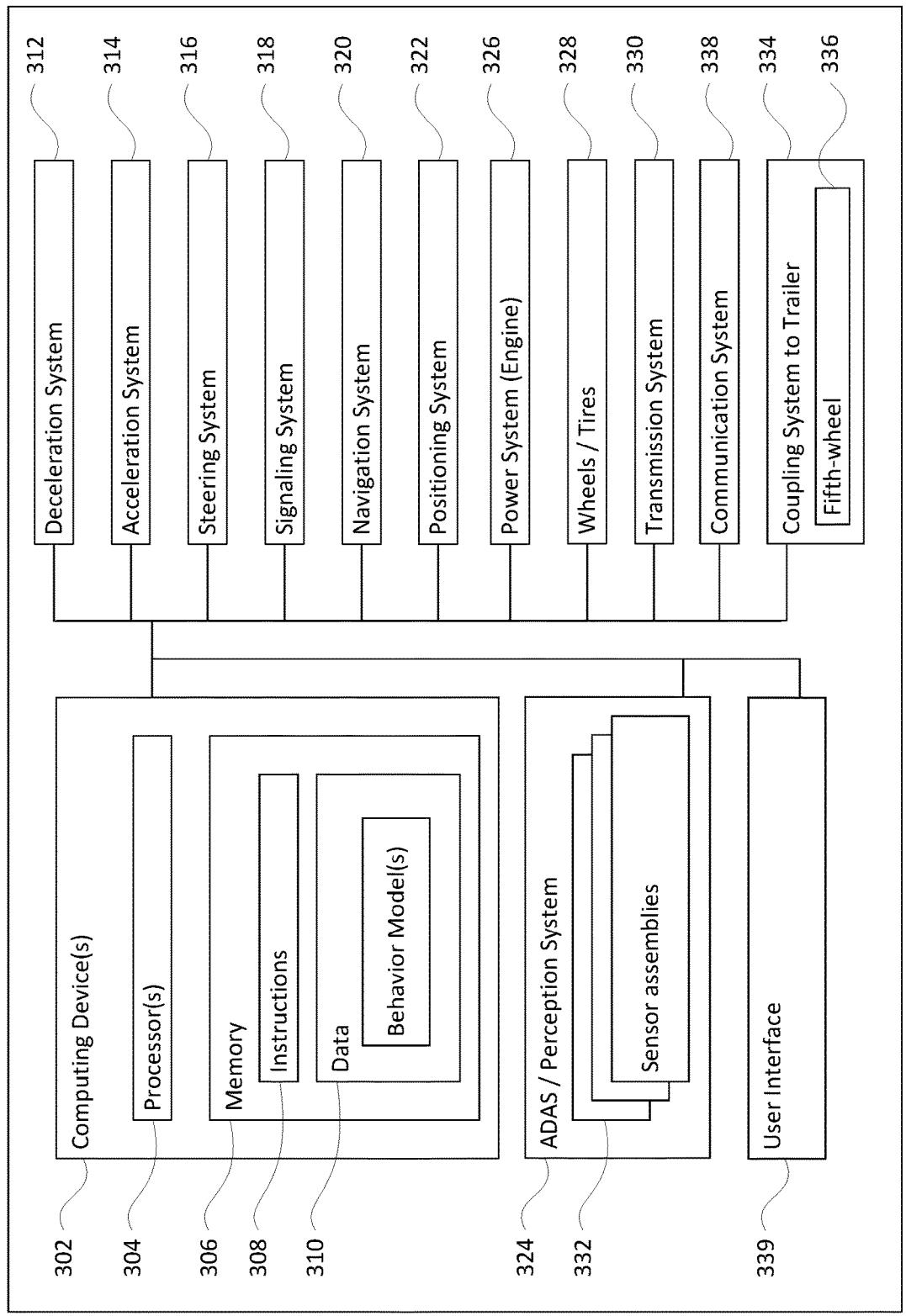
FIGS. 3A-B are block diagrams of systems of an example cargo-type vehicle in accordance with aspects of the technology.

FIG. 3A illustrates a block diagram 300 with various components and systems of a vehicle, e.g., vehicle 150 of FIG. 1C. By way of example, the vehicle may be a truck, farm equipment or construction equipment, configured to operate in one or more partially autonomous modes of operation, for instance in conjunction with ADAS. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. In this example, the control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form a driving computing system incorporated into vehicle 150. Similar to the arrangement discussed above regarding FIG. 2, the driving computing system of block diagram 300 may capable of communicating with various components of the vehicle in order to perform driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 328 are coupled to the transmission system 330, and the computing devices 302 may be able to receive information about tire pressure, balance, rotation rate and other factors that may impact driving. As with computing devices 202, the computing devices 302 may control the direction and speed of the vehicle by controlling various components. By way of example, computing devices 302 may aid navigating the vehicle to a destination location using data from the map information and navigation system 320.

The perception system 324 may be part of or work in conjunction with an advanced driver assistance system. Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300. Similarly, user interface 339, equivalent to user interface 234 may also be included for interactions with the driver and any passengers of the vehicle.

Figure 3B:
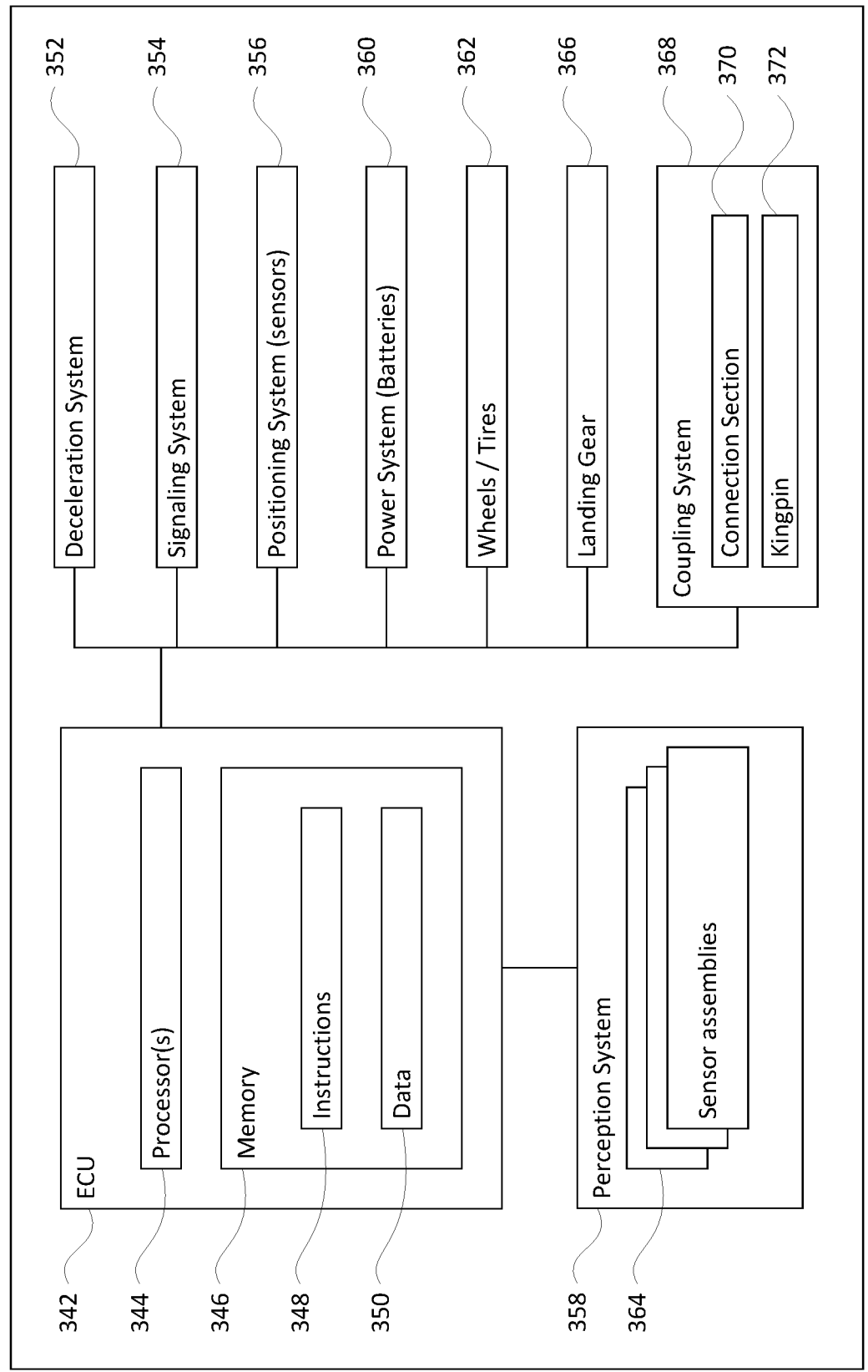

FIG. 3B illustrates an example block diagram 340 of systems of the trailer, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 254, and a positioning system 356. The ECU 342 may also be operatively coupled to a perception system 358 with one or more sensors for detecting objects in the trailer's environment and a power system 260 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for power and/or pneumatic links). The coupling system also includes a kingpin 372 configured for connectivity with the fifth-wheel of the tractor unit.

Example Implementations

According to aspects of the technology, information about driving errors and suboptimal maneuvering by a driver is tracked over time, for instance by an onboard driver assistance system or other system of a vehicle. This information may be stored by the vehicle and/or shared with a remote system, for instance to perform a corrective driving action, alert the driver, provide training, calibrate sensors of the vehicle's perception system, etc. Storing or transmitting the information may include anonymizing certain details about the obtained information, the vehicle and the trip. The information may be encrypted as part of the storage or transmission process.

Figure 4:
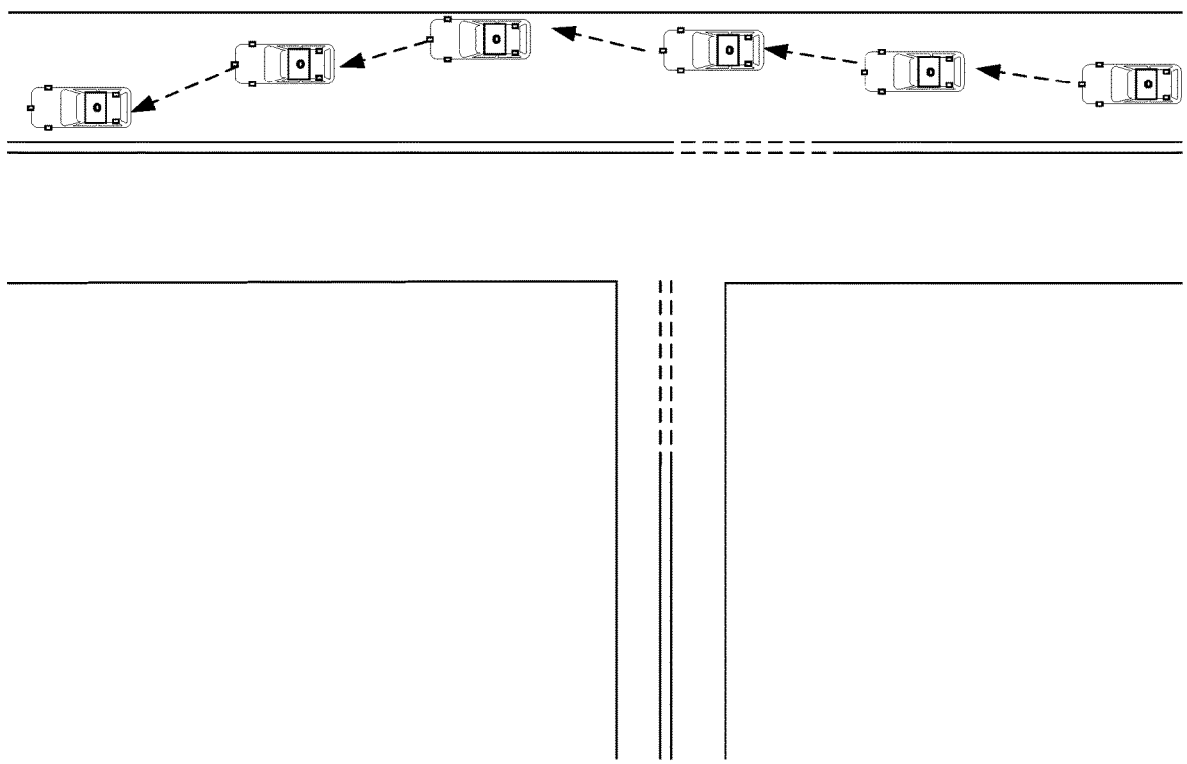
FIG. 4 illustrates an example drifting scenario in accordance with aspects of the technology.

In one example 400 illustrated in FIG. 4, the perception system, either alone or in conjunction with other systems such as the positioning system and/or navigation system, may track the vehicle's relative position in a lane of the roadway. As shown, the vehicle may drift within the lane but not cross over a lane marker, which would not trigger a lane departure warning. An instantaneous or short term (e.g., 2-3 seconds) evaluation may not identify any issues. However, a longer evaluation, such as 30 seconds or more, over multiple blocks or at least ¼ mile may identify repeated or periodic drifting. This could be due to driver inattentiveness, poor wheel alignment or some other issue.

Figure 5:
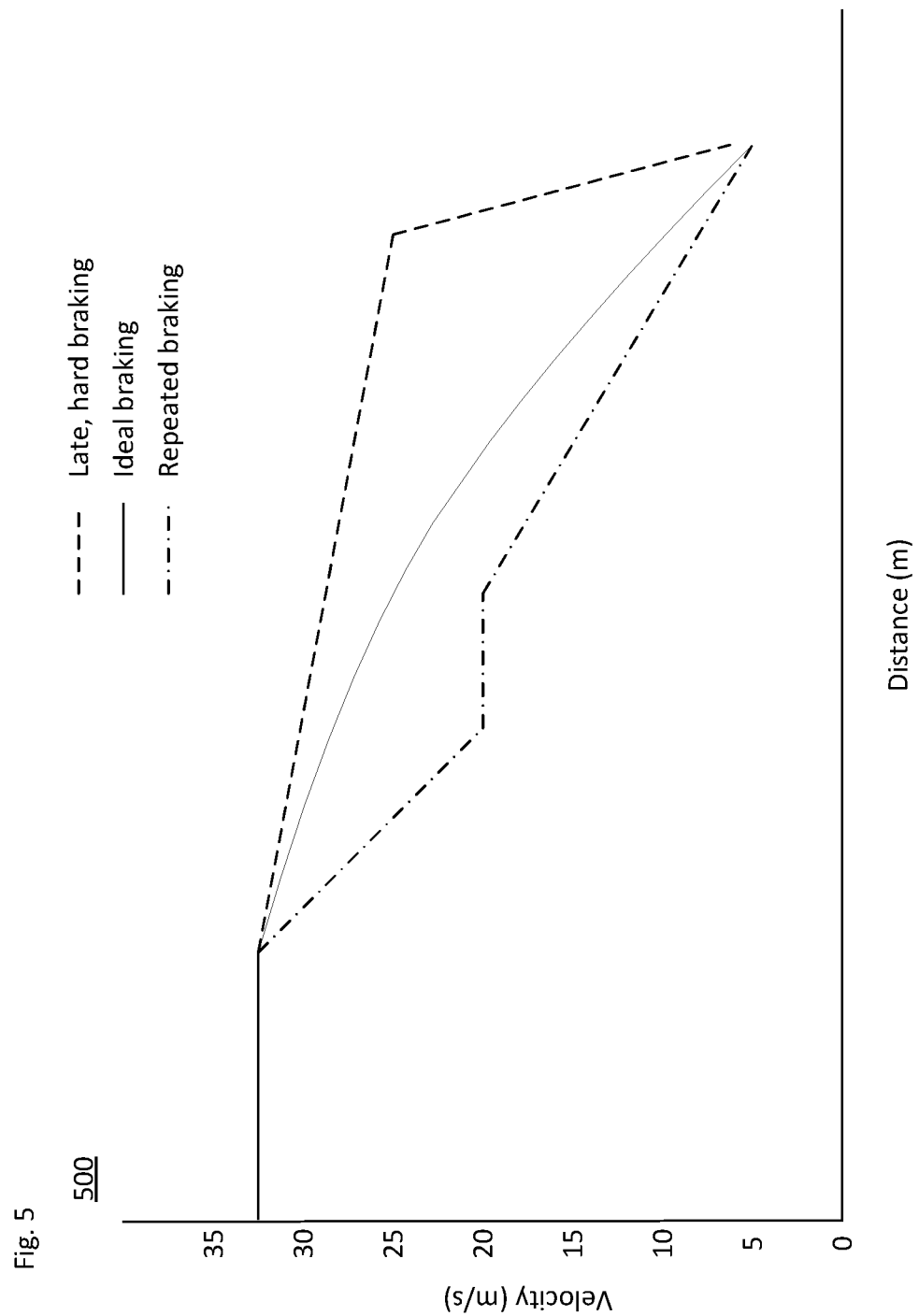
FIG. 5 illustrates an example braking scenario in accordance with aspects of the technology.

In another example 500 illustrated in FIG. 5, a forward collision warning system of the vehicle can track not only whether the driver has failed to brake, but whether the driver's reaction time for braking was significantly higher than for a normal (nominal) driver. This example shows three braking patterns: late, hard braking; repeated braking; and ideal (nominal) braking. Late, hard braking may be due to inattentiveness, an obstruction in the driver's field of view, a vehicle unexpectedly swerving into the lane or running a stop sign, etc. Here, the system may evaluate a variety of factors. For instance, did the braking exceed a nominal threshold for time to start braking? How much braking force (deceleration) was applied? Was the braking smooth (continuous) or jerky (stutter-type braking)? Additional details from the perception system may provide information about whether there was an obstruction or unexpected action by another vehicle. Similar to the above situation, an instantaneous or short term evaluation may make a determination that the driver's behavior was (or was not) aberrant based on a very small data set. An evaluation over a longer term or longer distance can identify a pattern of driver behavior.

In a further example 600 illustrated in FIG. 6, the onboard system tracks the driving speed. Tracking the vehicle's speed over time (a speed profile) can be evaluated in relation to the road type (e.g., freeway versus surface street), amount of traffic, time of day that can result in sun glare or poor lighting, detection of traffic signals and signs, as well as other factors.

For these and other driving situations, the onboard system employs state tracking and behavior analysis to determine whether the driver is operating within some range (or other metric) of permissible driving behavior. This may indicate that the driver's actions are aberrant due to a short term condition (e.g., inebriated, drowsy, inattentive) or other factor (e.g., a new driver with limited experience, first time using a particular vehicle such as a rental car, weather, etc.).

The state tracking and behavior analysis approach may create (or receive) a model of expected behavior. The number and/or types of aberrant behavior(s) may be tracked over one or both of a given timeframe or distance of travel. For instance, the driver may have 2 lane departures and 3 instances of weaving within the lane over a selected distance (e.g., a 4 mile stretch of road) or time (e.g., during a 5 minute timespan). Or, alternatively, the driver may be evaluated over an entire trip. The trip could be a daily drive to work, or longer trips that take hours or days, such as driving a bus route or a long-haul cargo delivery. Still further, the evaluation may be periodic, such as on a weekly or monthly basis.

The determination that these events occurred is one factor in the analysis. Individual actions and overall driving operations may be ranked and/or compared against a nominal driver behavior model. The model may be a general model based on aggregated, anonymized driving information for many drivers. Or, alternatively, the model may be specific to the particular driver, for instance based on their past driving history.

In one example, time of day is a factor of the model, for instance because nighttime can both increase the likelihood of certain impairments but may also reduce the driver's visibility. Weather conditions are another factor that can affect visibility. And driver age or experience are additional factors. In addition, time of year (season), geography (e.g., hilly versus flat), road type (e.g., windy versus straight, narrow lanes versus wide lanes) and other information can also be evaluated. Any combination of such factors may be incorporated into a nominal behavior model or a driver-specific behavior model. By way of example, the following distance, braking reaction time, speed profile or amount of drift within a lane can be assigned hard limits, scores, probability distributions, etc., which can be used to evaluate whether the driver's behavior over a certain time or distance is considered aberrant.

The behavior analysis may also consider additional information, such as the types of sensors and other equipment that are used by the vehicle. For instance, one type of sensor (e.g., radar) may have an accuracy on the order of meters, while another type of sensor (e.g., lidar or optical camera) may have an accuracy on the order of centimeters or millimeters. The given sensor may have a limited field of view (FOV). Here, if the sensor has meter-level accuracy, the onboard perception system may not be able to determine within an acceptable degree of certainty that the driver is weaving within the lane. Alternatively, the sensor(s) may have blind spots that prevent the perception system from determining within an acceptable degree of certainty why there were multiple lane departures or hard brakes. By way of example, the more severe (aberrational) the driver operation or reaction, the more certain the system may want to be about the cause of the behavior. Thus, the number, accuracy, FOV, and/or arrangement of sensors on the vehicle may also be factored into the evaluation. Information about the vehicle itself, such as vehicle size, braking distance and visibility (e.g., for a pickup truck vs a compact car), may also be applicable. Such information may be particularly helpful for commercial vehicles, such as trucks and busses.

It may also be relevant to evaluate the actions in context, for example by evaluating driving activities in view of map data and perception information. Thus, the system may determine that some of the weaving within the lane is due to construction that resulted in a narrowing of the lanes or a loss of the adjacent shoulder. This may include the driver assistance system being aware of the construction, either due to received map or traffic information. It may also include the driver assistance system obtaining real-time information about the driving environment from analysis of data obtained by the perception system, for instance from detection of one or more construction vehicles, construction equipment or signage, debris or other indicia of a construction zone, or the presence of a tailgater behind the vehicle. See, for instance, the discussion of construction zones in U.S. Pat. No. 9,937,924, and the discussion of tailgating in U.S. Pat. No. 10,168,706, the entire disclosures of which are incorporated by reference herein. In these types of situations, the system may not consider the weaving to be aberrant. In the case of lane departure(s), the driver's actions may be due to another vehicle making an unexpected lane change or coming too close laterally or behind the driver's vehicle. Given this, the evaluation of driver behavior should be robust to single incidents. That is, an otherwise normal driving profile with an isolated case of weaving or hard (or soft) braking is more likely a response to road conditions, while another driving profile where such action happens once every few minutes is suggestive of potential impairment.

Notwithstanding this, a longer evaluation period may be desirable for fleet driving, such as for a bus driver, delivery person or tractor-trailer driver. In these situations, the system may aggregate driving data for an individual driver over hours, days, weeks, etc. It may also aggregate data for many drivers of the fleet, for instance during a given period of time (e.g., morning or evening rush hour), along the same route, etc. In such cases a new driver can be evaluated against a baseline of other drivers to determine if he or she is operating the vehicle in a manner that exceeds a threshold operating criteria (e.g., speed, repeated braking, lane changes, etc.). Training and/or intervention can be provided based on this the information.

In addition, the sophistication of the an ADAS or autonomous driving system may play a role in how much context is needed to evaluate the driver's actions. By way of example, a level 2-type ADAS system that only relies on a deceleration sensor may not have sufficient context for why a human driver braked suddenly if there was a potential cut in, pedestrian who enter road from sidewalk, etc. Here, the ADAS system would likely require tracking deviations over a longer period of time, e.g., minutes (or miles) to get a better signal to noise ratio to enable a determination as to whether the actions are aberrant. The longer the time scale, the less local context matters. For example, multiple braking incidents that are temporally isolated (e.g., minutes or hours apart) can indicate aberrational behavior, without the on-board system evaluating why a particular incident occurred.

In contrast, a more robust partially or fully autonomous level 3, 4 or 5 system could better understand the reason(s) behind a braking event. For instance, in addition to detecting rapid deceleration, the perception system (e.g., lidar, radar and/or camera sensors) could detect that a vehicle in an adjacent lane has begun to maneuver into the driver's lane, or that a pedestrian is preparing to step off of the curb and into a crosswalk. By way of example, another car making repeated lane changes or otherwise weaving in and out of traffic may change how the driver will react. So if the driver is behind or next to the other vehicle at a traffic light, he or she may give the other vehicle more time to pull away once the light changes. This delay may appear to be a slow reaction unless the on-board system understands certain a priori information about the other vehicle. In these cases, on-board behavior prediction models may provide a probability that the other vehicle or pedestrian will enter the driver's lane of travel or take some other action. Here, the more sophisticated on-board systems can differentiate cases where braking or swerving is correlated to some other agent or event in the external environment, versus those that seem without clear cause. In such cases, the system may be able to determine whether the driver's response falls within a predicted or threshold range of actions for a single incident.

One result of the state tracking and behavior analysis may be an error signal or other type of variance signal indicating how well (or poorly) the driver has performed various actions or responded to certain conditions. The system uses sensor information (e.g., camera and/or lidar information) to determine position within a lane. Departure of the vehicle from the center of the lane is classified into two maneuvers: lane changes and weaves. In one scenario, a lane change is classified by a full transition from one lane center to another, while a weave is a movement that returns back to the lane center the movement originated from. The weave may be classified according to the severity of the movement, e.g., based on an amount of the lateral distance from the center of the lane and/or lateral acceleration information regarding an amount of "jerk" during the weave. The classification may also consider whether the weaving exceeds a threshold value. Alternatively or additionally, more severe weaving may be weighted more heavily than less severe weaving. Other scenarios may classify other driving actions, such as rapid speed changes (e.g., an increase in speed of at least 5-10 mph multiple times) or hard braking (e.g., a decrease in speed by 10-15 mph). Still other scenarios may classify inactions, such as failure to use a turn signal when changing lanes, failing to initiate braking when road situations detected by the sensor(s) indicate that such braking should occur, etc.

In these scenarios, the system is able to maintain a driving log that may be indexed according to time and distance traveled, and in which weaves and other driving actions and/or inactions are labeled events in the driving log. The driving log may be queried by incident. For example, the number of weaves in a given amount of time, or a given distance traveled may be queried. This information may be stored in an on-board or remote database. By way of example, the information may be stored in conjunction with a driver-specific behavior model. The information may be queried by on-board systems such as a driving planner or behavior prediction module.

For longer term analysis of driver actions, e.g., over weeks or months, it may be possible to determine whether there is a degradation in certain actions by the driver, which may indicate other issues to be addressed. For instance, the system could evaluate whether reactions times have slowed for particular actions (e.g., braking, changing lanes, proceeding after a full stop, etc.) Over the long term, the system could also look for cyclical patterns. For instance, in a commercial driving situation the system could measure not just performance over time, but the profile of the driver's performance within a shift, or day versus night, etc.

Once the system has determined that the driver's behavior is aberrant and outside of a threshold or other range of permissible actions, one or more different actions may be taken by the vehicle. One class of actions includes warning the driver, for instance to lead the driver to pay more attention or to pull over. Here, audible, visual and/or haptic feedback may be provided to the driver regarding an individual action (e.g., in-lane weaving or hard braking), or about repeated actions (e.g., multiple lane departures or failure to slow down at a yellow light). Another class of actions involves autonomous operation of the vehicle. Here, the speed of the vehicle may be limited, or even slow the vehicle down over time so it comes to a full stop. Alternatively, depending on the autonomous capabilities of the vehicle, it may take over partial or fully autonomous control of the driving.

Figure 7A:
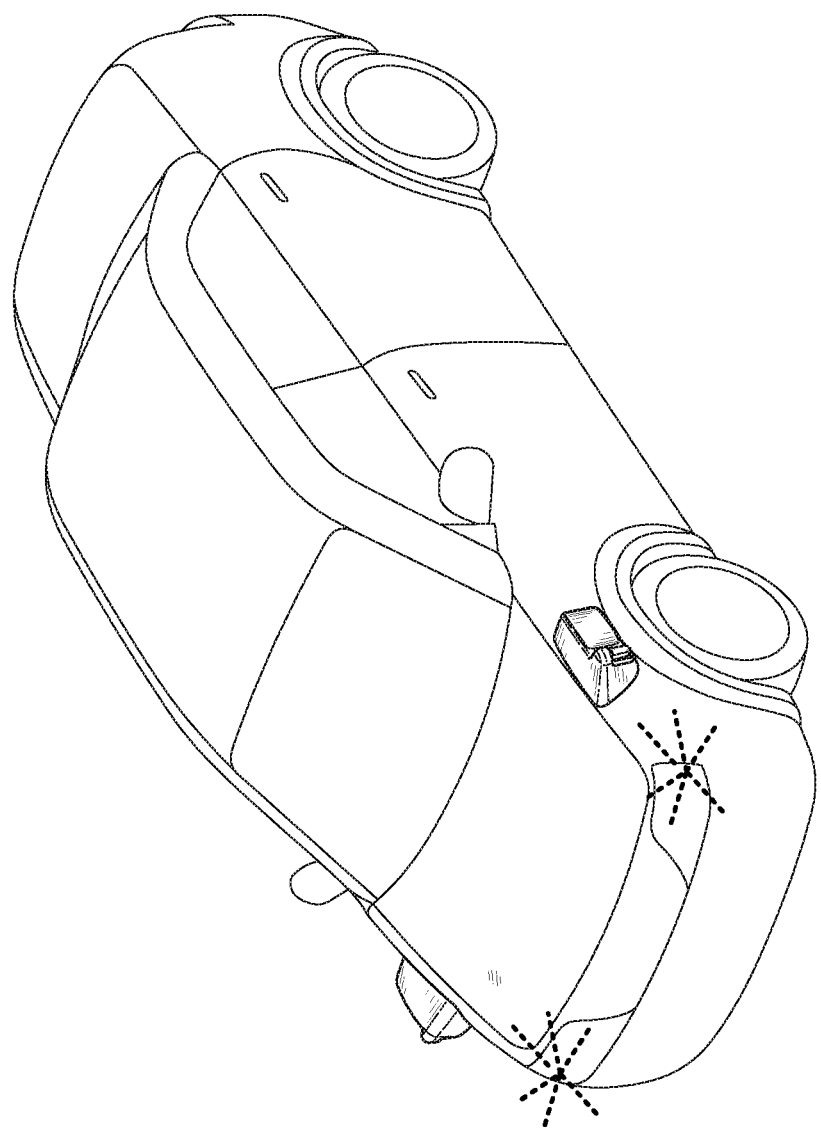
FIGS. 7A-B illustrate examples of alerting nearby vehicles in accordance with aspects of the disclosure.
Figure 7B:
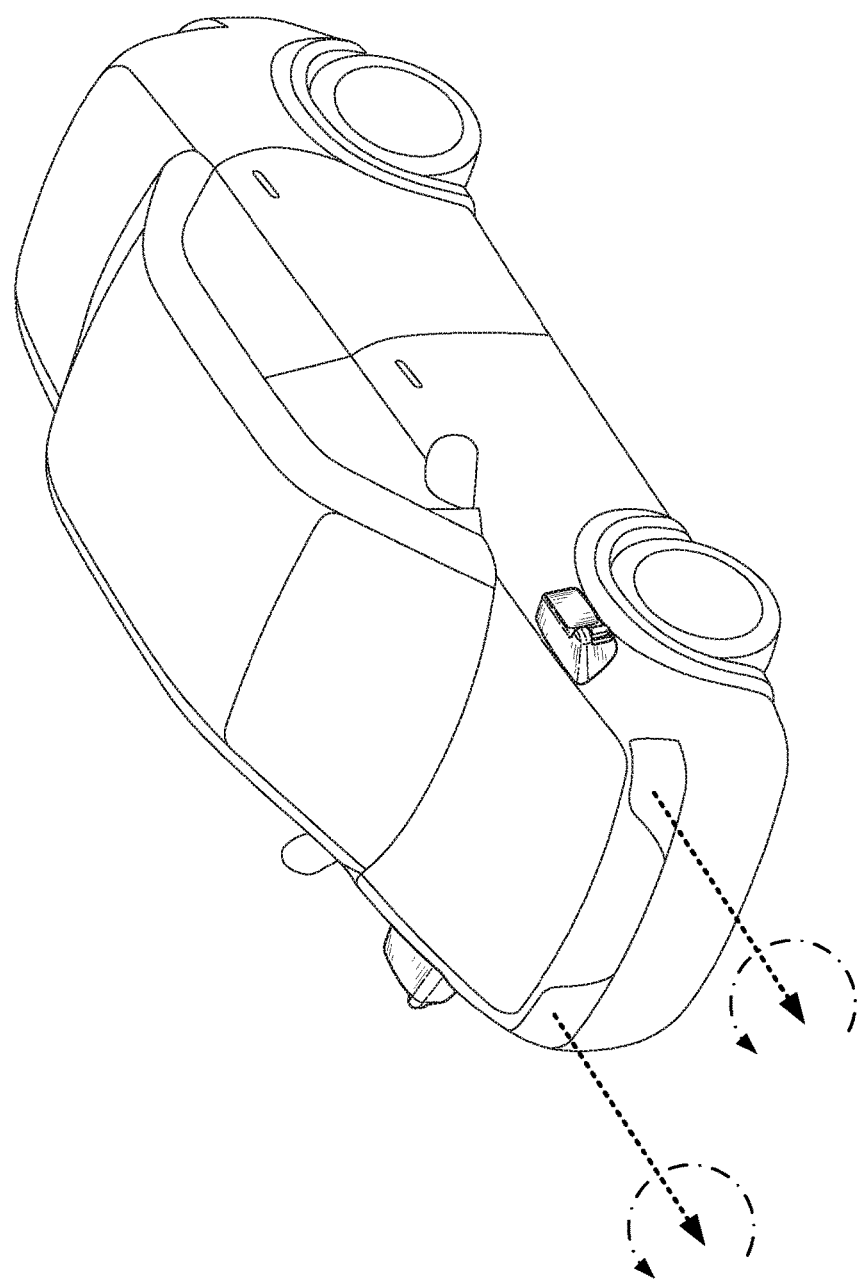
Figure 8A:
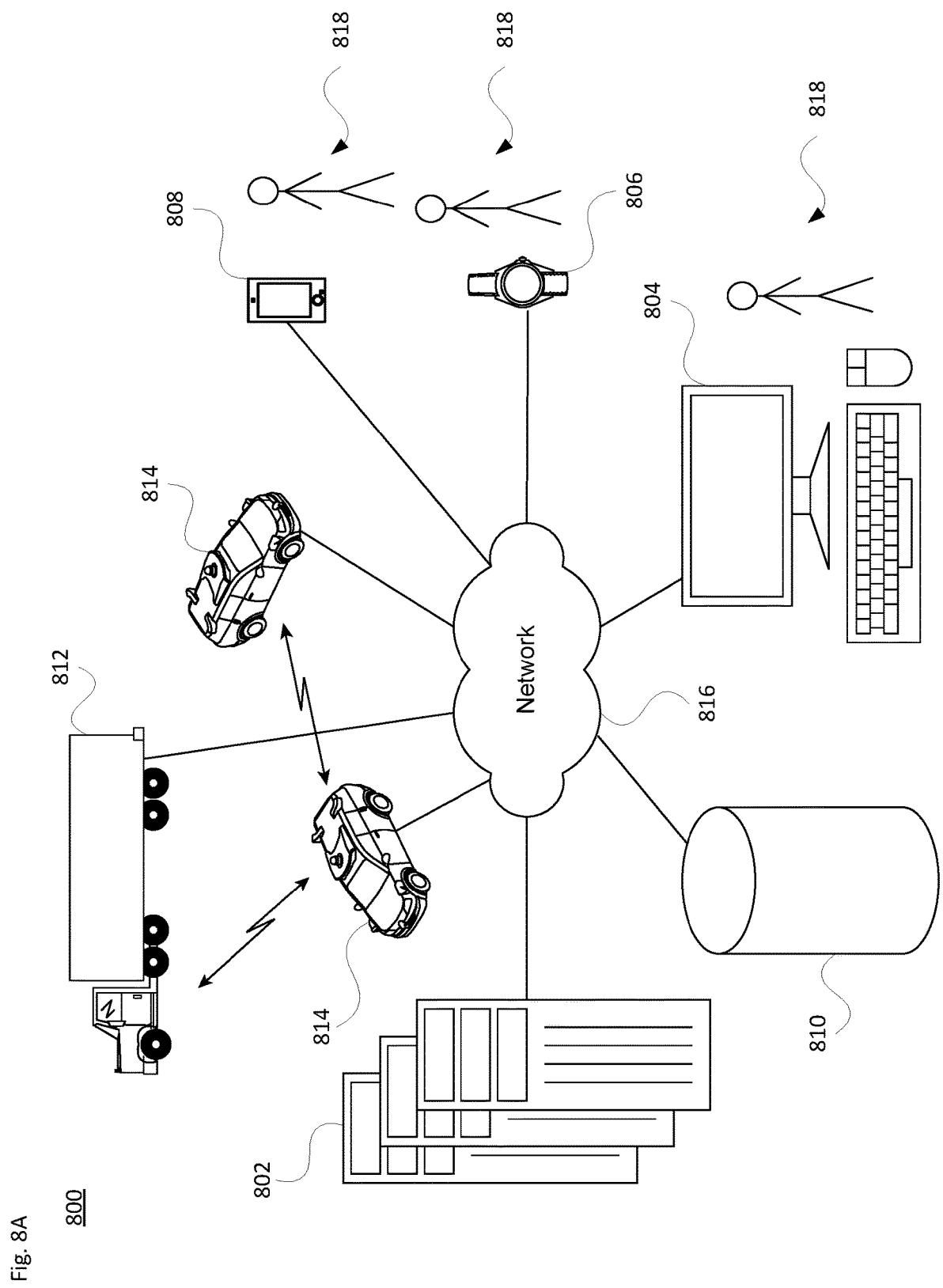
FIGS. 8A-B illustrates an example system in accordance with aspects of the technology.
Figure 8B:
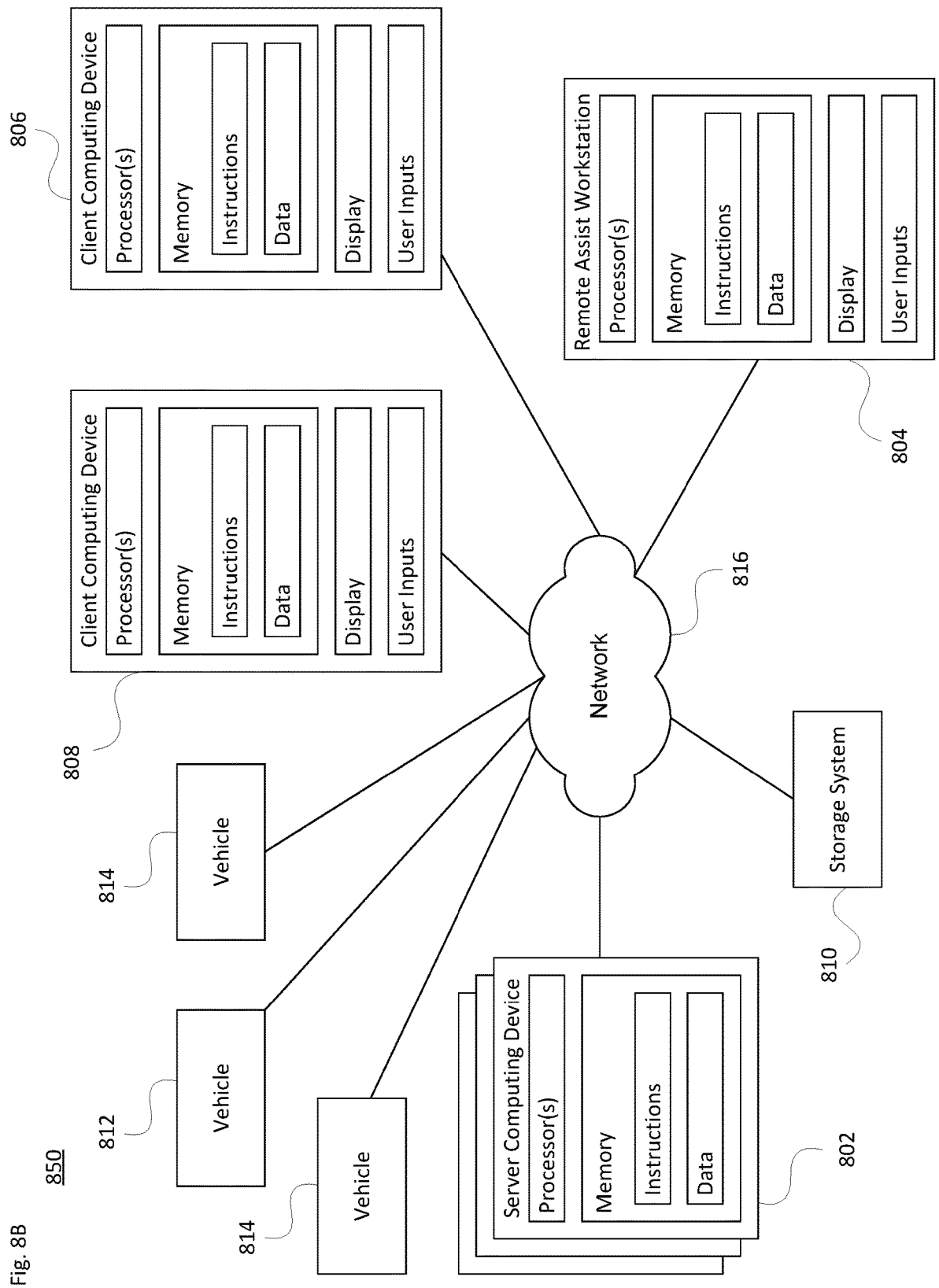

A further class of actions includes alerting other drivers. For instance, as shown in the examples of FIGS. 7A-B, this may be done by turning on the hazard lights (700 of FIG. 7A) or changing the headlight orientation/pattern (710 of FIG. 7B). Other vehicles could be alerted via a V2V communication system. Remote systems and services, e.g., driver assistance, fleet management, law enforcement, etc., may also be alerted, such as shown in FIGS. 8A-B discussed below. A log of the behavior-related information may be stored on the vehicle or in a remote system for future analysis, behavior model refinement and other purposes.

In addition to the above classes of actions, the state tracking and behavior analysis may be used for real time or offline driver training. For example, the acquired information may be used to train novice drivers or other drivers that may need retraining. This may be done via in-vehicle feedback (e.g., audible, visual and/or haptic feedback) or a report provided to the driver offline. Information such as local driving regulations could be employed with such training. However, in-vehicle training may be dependent on how advanced the onboard driver assistance system is. For instance, a level 2 type partial autonomy system may not be able to support such training, but a level 3 or level 4 type system could train the driver during certain manual driving operations.

Finally, the acquired driving information may be used to help calibrate or otherwise monitor the vehicle's systems themselves. For instance, if the system detects repeated weaving to the left in the lane but not to the right, this may indicate that a positioning sensor (e.g., accelerometer or gyroscope) is not properly calibrated, the wheels are not aligned, or that the camera extrinsic parameters are no longer sufficiently calibrated. Or if one brake sensor detects hard braking but other brake sensors and/or accelerometers do not, it may indicate that that brake sensor needs to be replaced. Driver behavior may also be used as another signal or a tiebreaker when determining whether the issue is due to a driving action, sensor failure or other problem. For instance, if a radar-based braking system consistently attempts to have the vehicle to brake or otherwise slow down, but a camera-based system does not (or vice versa), the actions of the driver could be used to determine which sensor is likely malfunctioning.

As noted above, the technology is applicable for various types of vehicles, including passenger cars, buses, RVs and trucks or other cargo carrying vehicles. In addition to using the driver operation information for operation of the vehicle, this information may also be shared with other vehicles, such as vehicles that are part of a fleet.

One example of this is shown in FIGS. 8A and 8B. In particular, FIGS. 8A and 8B are pictorial and functional diagrams, respectively, of an example system 800 that includes a plurality of computing devices 802, 804, 806, 808 and a storage system 810 connected via a network 816. System 800 also includes vehicles 812 and 814, which may be configured the same as or similarly to vehicles 100 and 150 of FIGS. 1A-B and 1C-D, respectively. Vehicles 812 and/or vehicles 814 may be part of a fleet of vehicles. Although only a few vehicles and computing devices are depicted for simplicity, a typical system may include significantly more.

As shown in FIG. 8B, each of computing devices 802, 804, 806 and 808 may include one or more processors, memory, data and instructions. Such processors, memories, data and instructions may be configured similarly to the ones described above with regard to FIG. 2.

The various computing devices and vehicles may communication via one or more networks, such as network 816. The network 816, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance, computing device 802 may include one or more server computing devices that are capable of communicating with the computing devices of vehicles 812 and/or 814, as well as computing devices 804, 806 and 808 via the network 816. For example, vehicles 812 and/or 814 may be a part of a fleet of vehicles that can be dispatched by a server computing device to various locations. In this regard, the computing device 802 may function as a dispatching server computing system which can be used to dispatch vehicles to different locations in order to pick up and drop off passengers or to pick up and deliver cargo. In addition, server computing device 802 may use network 816 to transmit and present information to a user of one of the other computing devices or a passenger of a vehicle. In this regard, computing devices 804, 806 and 808 may be considered client computing devices.

As shown in FIG. 8A each client computing device 804, 806 and 808 may be a personal computing device intended for use by a respective user 818, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 806 and 808 may be mobile phones or devices such as a wireless-enabled PDA, a tablet PC, a wearable computing device (e.g., a smartwatch), or a netbook that is capable of obtaining information via the Internet or other networks.

In some examples, client computing device 804 may be a remote assistance workstation used by an administrator or operator to communicate with drivers of dispatched vehicles. Although only a single remote assistance workstation 804 is shown in FIGS. 8A-8B, any number of such workstations may be included in a given system. Moreover, although operations workstation is depicted as a desktop-type computer, operations workstations may include various types of personal computing devices such as laptops, netbooks, tablet computers, etc.

Storage system 810 can be of any type of computerized storage capable of storing information accessible by the server computing devices 802, such as a hard-drive, memory card, ROM, RAM, DVD, CD-ROM, flash drive and/or tape drive. In addition, storage system 810 may include a distributed storage system where data is stored on a plurality of different storage devices which may be physically located at the same or different geographic locations. Storage system 810 may be connected to the computing devices via the network 816 as shown in FIGS. 16A-B, and/or may be directly connected to or incorporated into any of the computing devices.

Storage system 810 may store various types of information. For instance, the storage system 810 may also store autonomous vehicle control software which is to be used by vehicles, such as vehicles 812 or 814, to operate such vehicles in an autonomous driving mode. Storage system 810 may also store driver-specific or nominal driving models. The model information may be shared with specific vehicles or the fleet as needed. It may be updated in real time, periodically, or off-line as additional driving information is obtained. The storage system 810 can also include map information, route information, braking and/or acceleration profiles for the vehicles 812 and 814, weather information, etc. This information may be shared with the vehicles 812 and 814, for instance to help with behavior analysis by the on-board computer system(s), such as during real-time driving by a particular driver.

The remote assistance workstation 804 may access the stored information and use it to assist operation of a single vehicle or a fleet of vehicles. Remote assistance may be used to communicate directly with the driver via the on-board user interface, or indirectly via a client computing device of the driver. Here, for example, information may be provided to the driver regarding current driving operations, training, etc.

Figure 9:
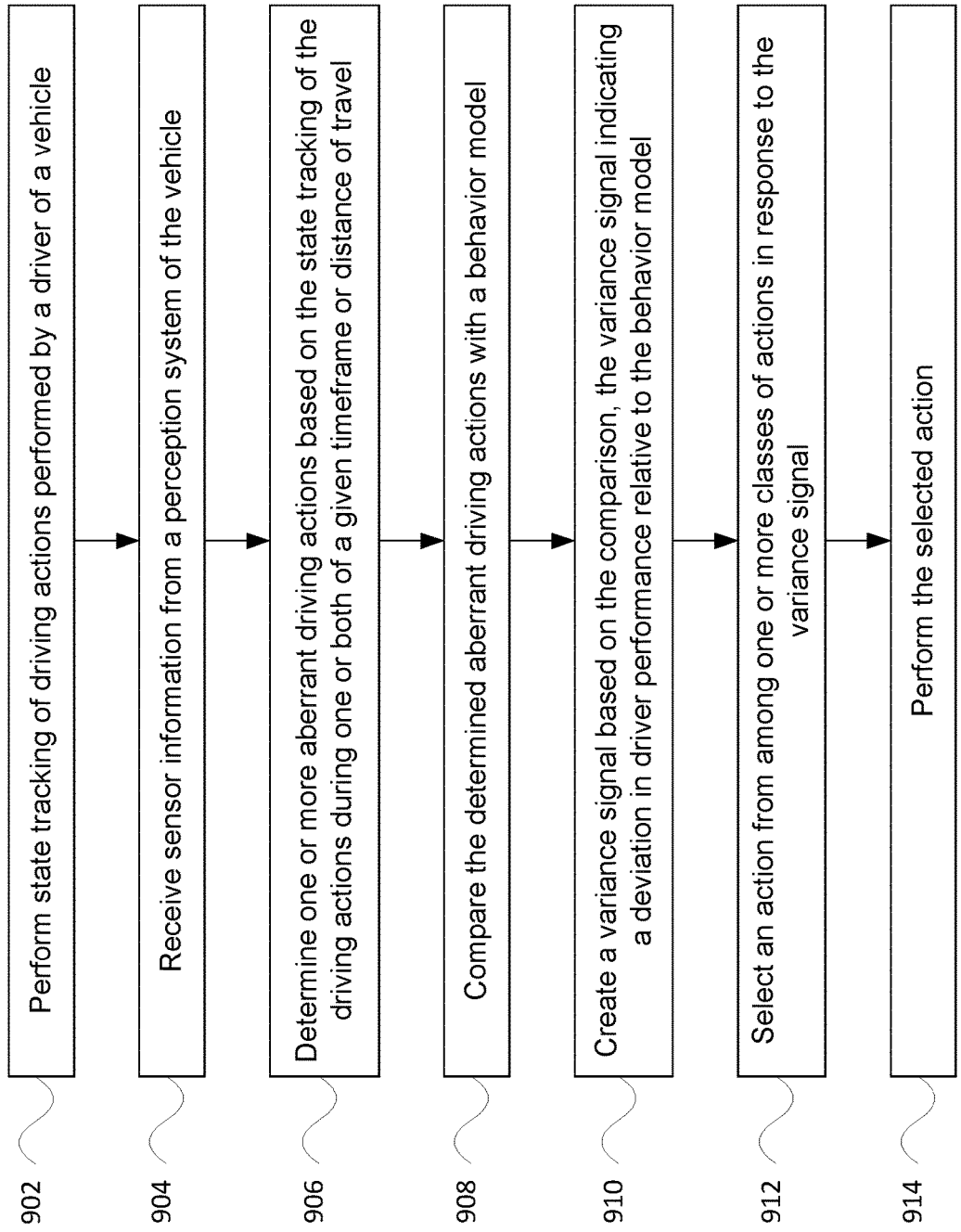
FIG. 9 illustrates an example method in accordance with aspects of the technology.

FIG. 9 illustrates an example method of operation 900 in accordance with the above discussions. As shown in block 902, the method performs state tracking of driving actions performed by a driver of a vehicle. At block 904, sensor information is received from a perception system of the vehicle. At block 906, the method determines one or more aberrant driving actions based on the state tracking of the driving actions during one or both of a given timeframe or distance of travel. At block 908, the determined aberrant driving actions are compared with a behavior model. At block 910 a variance signal is created based on the comparison. The variance signal indicates a deviation in driver performance relative to the behavior model. At block 912 an action is selected from among one or more classes of actions in response to the variance signal. And at block 914 the selected action is performed. The selected action may including autonomously taking a corrective driving action or providing an alert to the driver regarding the aberrant driving actions.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations described above, including the method illustrated in FIG. 9, may be performed in a different order or simultaneously, unless expressly indicated otherwise herein.

The invention claimed is:

1. A method comprising:
performing, by one or more processors, state tracking of driving actions performed by a driver of a vehicle while the vehicle travels over a given distance;
receiving, by the one or more processors, sensor information from a perception system of the vehicle, the sensor information including information associated with an external environment of the vehicle;
maintaining, by the one or more processors, a driving log based on the state tracking of driving actions and the sensor information, the driving log indicating each time one of the driving actions performed by the driver falls outside of a threshold range and each time the driver fails to perform a driving action;
determining, by the one or more processors based on the driving log, whether the driver's behavior is aberrant; and
when the driver's behavior is determined to be aberrant, controlling, by the one or more processors, the vehicle to perform one or more actions while operating in a semi-autonomous driving mode.

2. The method of claim 1, wherein the determination of whether the driver's behavior is aberrant includes comparing the driving actions against a model of expected driver behavior, the model being an aggregated model based on information from multiple drivers other than the driver of the vehicle.

3. The method of claim 1, wherein the determination of whether the driver's behavior is aberrant includes comparing the driving actions against a model, the model being specific to the driver of the vehicle based on his or her past driving history.

4. The method of claim 1, wherein the determination of whether the driver's behavior is aberrant includes evaluating at least one of a number of sensors of the perception system, an accuracy of each sensor of the perception system, a sensor field of view, or an arrangement of sensors around the vehicle.

5. The method of claim 1, wherein the determination of whether the driver's behavior is aberrant includes evaluating at least one of lane departures, weaving within a lane, a speed profile, a braking profile, or a turning profile.

6. The method of claim 1, wherein the determination of whether the driver's behavior is aberrant includes comparing the state tracking of the driving actions with at least one of map information and the received sensor information.

7. The method of claim 1, wherein the one or more actions include providing haptic feedback to the driver in order to warn the driver that the driver's behavior is aberrant.

8. The method of claim 1, further comprising:
performing, by the one or more processors, calibration of one or more sensors of the perception system based on the state tracking.

9. The method of claim 1, wherein the one or more actions include changing an orientation or a pattern of one or more headlights of the vehicle in order to alert other vehicles that the driver's behavior is aberrant.

10. The method of claim 1, wherein the external environment includes at least one of (i) a road condition or (ii) at least one other vehicle, and the road condition includes construction that resulted in a narrowing of one or more lanes or a loss of an adjacent shoulder.

11. The method of claim 1, wherein the driver's behavior is aberrant due to the driver being at least one of inebriated, drowsy or inattentive.

12. The method of claim 1, wherein the driver's behavior is aberrant due to the driver being inexperienced.

13. The method of claim 1, wherein the sensor information further includes information associated with at least one of an object or a condition within the vehicle.

14. The method of claim 13, wherein the sensor information indicates at least one of a position of the driver, whether the driver's hands are on a steering wheel of the vehicle, eye gaze direction associated with the driver, or one or more factors associated with equipment of the vehicle.

15. The method of claim 1, wherein the one or more actions include limiting or reducing a speed of the vehicle.

16. A control system for a vehicle, the control system comprising:
memory configured to store a behavior model; and
one or more processors operatively coupled to the memory, the one or more processors being configured to:
perform state tracking of driving actions performed by a driver of the vehicle while the vehicle travels over a given distance;
receive sensor information from a perception system, the sensor information including information associated with an external environment of the vehicle;
maintain a driving log based on the state tracking of driving actions and the sensor information, the driving log indicating each time one of the driving actions performed by the driver falls outside of a threshold range and each time the driver fails to perform a driving action;
determine, based on the driving log, whether the driver's behavior is aberrant; and
when the driver's behavior is determined to be aberrant,
control the vehicle to perform one or more actions while operating in a semi-autonomous driving mode.

17. The control system of claim 16, wherein the determination of whether the driver's behavior is aberrant includes comparing the driving actions against a model of expected driver behavior, the model being an aggregated model based on information from multiple drivers other than the driver of the vehicle.

18. The control system of claim 16, wherein the determination of whether the driver's behavior is aberrant includes comparing the driving actions against a model of expected driver behavior, the model being specific to the driver of the vehicle based on his or her past driving history.

19. The control system of claim 16, wherein the determination of whether the driver's behavior is aberrant includes an evaluation of at least one of a number of sensors of the perception system, an accuracy of each sensor of the perception system, a sensor field of view, or an arrangement of sensors around the vehicle.

20. The control system of claim 16, wherein the determination of whether the driver's behavior is aberrant includes an evaluation of at least one of lane departures, weaving within a lane, a speed profile, a braking profile, or a turning profile.

21. The control system of claim 16, wherein the determination of whether the driver's behavior is aberrant includes a comparison of the state tracking of the driving actions with at least one of map information and the received sensor information.

22. The control system of claim 16, wherein the one or more actions include providing haptic feedback to the driver in order to warn the driver that the driver's behavior is aberrant.

23. The control system of claim 16, wherein the one or more processors are further configured to perform calibration of one or more sensors of the perception system based on the state tracking.

24. The control system of claim 16, wherein the one or more actions include changing an orientation or a pattern of one or more headlights of the vehicle in order to alert other vehicles that the driver's behavior is aberrant.

25. A vehicle configured to evaluate aberrant driving actions of a driver while operating in the semi-autonomous driving mode, the vehicle including the control system of claim 16, and a driving system and a perception system operatively coupled to the control system.

* * * * *